United States Patent
Sebern

[11] 3,727,711
[45] Apr. 17, 1973

[54] TANDEM DISC BRAKE ASSEMBLY

[75] Inventor: James R. Sebern, Decatur, Ill.

[73] Assignee: Caterpillar Tractor Co., Peoria, Ill.

[22] Filed: Apr. 23, 1971

[21] Appl. No.: 136,887

[52] U.S. Cl. .............................. 180/24.05, 188/71.5
[51] Int. Cl. ............................................. B62d 61/00
[58] Field of Search ..................... 180/24.05, 24.08, 180/24.01; 188/71.5

[56] References Cited

UNITED STATES PATENTS

| | | |
|---|---|---|
| 2,953,040 | 9/1960 | Christenson et al. ............. 188/71.5 X |
| 3,033,319 | 5/1962 | Wrigley et al. ................... 188/71.5 X |
| 2,824,615 | 2/1958 | Lado .............................. 180/24.05 |
| 1,741,425 | 12/1929 | Masury ........................... 180/24.05 |
| 2,914,140 | 11/1959 | Werner ............................ 188/71.5 |

Primary Examiner—Robert G. Sheridan
Assistant Examiner—Frank E. Werner
Attorney—Fryer, Tjensvold, Feix, Phillips & Lempio

[57] ABSTRACT

There is disclosed a drive axle support assembly including a housing which independently carries a drive axle and a disc brake assembly such that the housing may be attached or detached from a support frame without disturbing the drive shaft bearing supports or the brake assembly within the housing.

5 Claims, 1 Drawing Figure

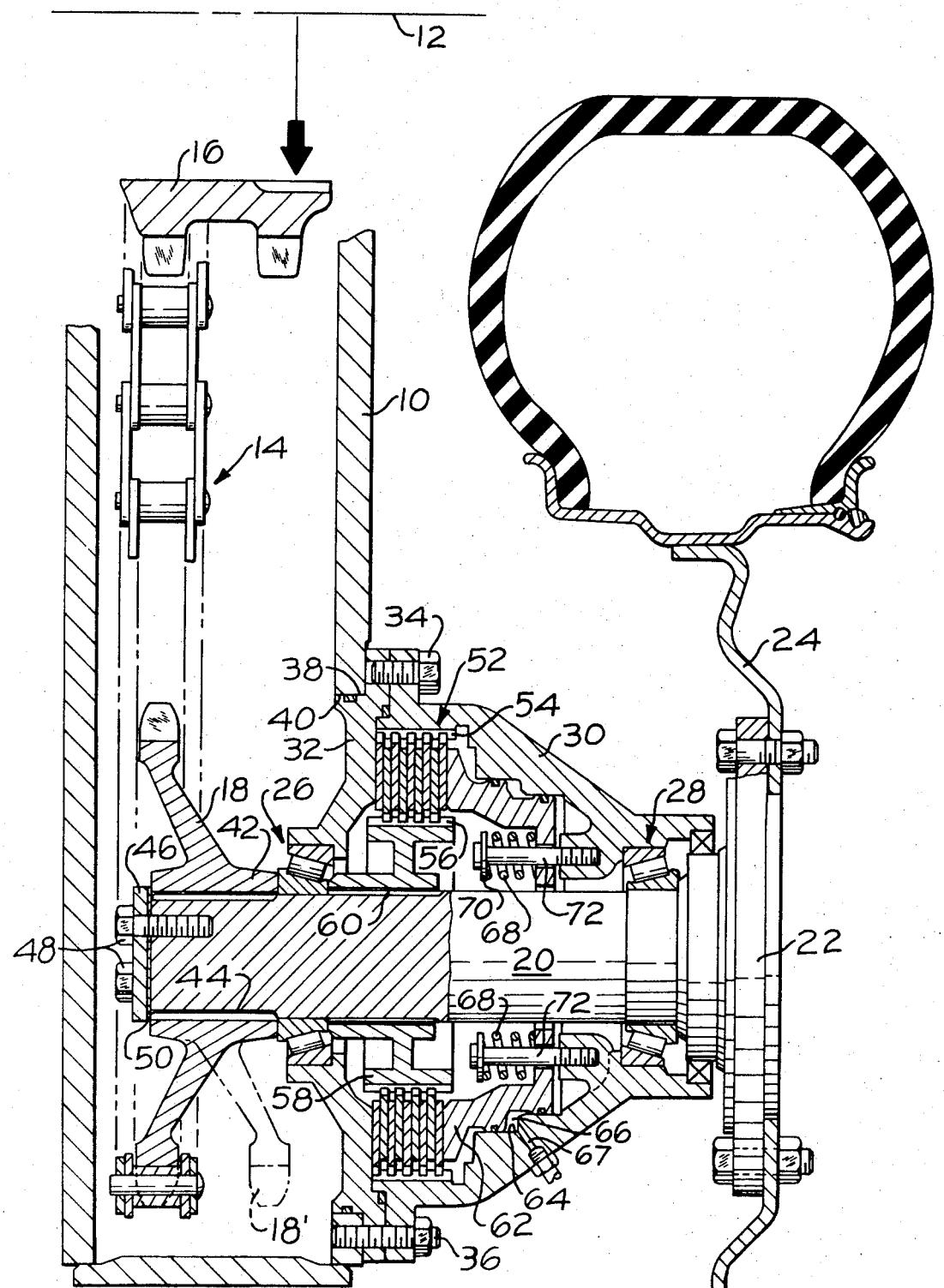

TANDEM DISC BRAKE ASSEMBLY

BACKGROUND OF THE INVENTION

The present invention relates to a drive axle and pertains more particularly to a complete drive axle assembly comprising a housing for rotatably supporting a drive shaft in pre-adjusted support bearings and for housing a disc brake assembly.

Some vehicles such as motor graders employ a number of drive wheels which are independently supported from oscillatable support members. With conventional designs, the wheel spindle is rotatably supported by inner and outer bearings carried by the inner and outer walls of the tandem housing. This arrangement provides good support leverage for the bearings but complicates the adjustment thereof. Also, distortion of the tandem housing can result in misalignment of the bearings.

One construction has used disc brake plus conventional bearings support methods with a pair of tapered roller bearings and a ground spacer on the wheel end of the spindle shaft. While this arrangement does eliminate the need for bearing adjustment, it is costly and when subjected to side loading as when operating on a side slope or even when working against side forces induced by the blade, the two tapered bearings do not share the radial loads equally, which considerably reduces the life of these bearings.

One way to obtain a more adequate life with the twin tapered roller bearings is to use a straight roller bearing which involves added expense. When a brake unit is handled as a unit and installed in a tandem housing of previous design, the straight roller bearings are subjected to a risk of damage or contamination.

Another problem with the prior art constructions is that any repair in the field such as replacement of a shaft or bearing requires complete dismantling of the entire assembly. This leaves the bearings and brake assembly exposed for possible contamination by dirt or grit. It further requires fitting and adjustment of bearings in the field where precision equipment is usually not available.

SUMMARY OF THE INVENTION

The primary object of the present invention is to provide a disc brake assembly for a tandem drive unit that overcomes the above defects of the prior art.

Another object of the present invention is to provide a unitary drive shaft and brake support assembly that is simple to construct and economical to use.

A further object of the present invention is to provide an improved drive shaft and brake assembly for tandem drive vehicles.

In accordance with the present invention, a swing axle for a tandem drive vehicle is supported in bearings in a detachable housing. The housing also contains the brake assembly so that the brake assembly and bearing support assembly for the axle is independent of the swing arm. This construction enables these items to be pre-adjusted and pre-assembled prior to attachment to the swing arm.

BRIEF DESCRIPTION OF THE DRAWING

The FIGURE is a fragmentary view in section of an assembly constructed in accordance with the present invention.

DETAILED DESCRIPTION OF PREFERRED EMBODIMENTS

Referring now to the drawing, there is shown a preferred embodiment of the assembly shown in conjunction with a tandem drive swing axle as may be used on a road grader. More particularly, there is illustrated a pivotal swing or support arm 10 which includes a mirror image assembly extending to the other side of the main drive shaft and adapted to pivot or oscillate about the center axis 12 of the drive shaft (not shown). The swing arm 10 serves as a housing for a drive chain 14 which is operative to transmit power from the main drive axle by means of a double drive sprocket 16 to a sprocket 18 mounted on the stub shaft 20. A similar sprocket carried on a stub shaft mounted at the opposite end of the housing 10 is mounted as shown in phantom at 18' and driven by another chain (not shown) from drive sprocket 16. The stub shaft 20 is appropriately connected such as by a flange 22 to a driving wheel 24 for supporting and propelling the vehicle. The stub shaft 20 is rotatably supported by means of a pair of bearing assemblies 26 and 28 in substantially bell shaped housing 30 and end plate 32. The bell shaped housing 30 and end plate 32 are suitably secured together by means such as by bolts 34 and secured by means of bolts 36 to the housing 10 with a diameter defining a pilot cylinder 38 of plate 32 fitted into a pilot bore 40 in the housing 10.

In applications where the shaft 20 undergoes side or end thrust, the bearings 26 and 28 are preferably tapered roller bearings for sustaining such end thrust and may be adjustable for pre-tensioning or to take up wear. For adjustment purposes, the hub 42 of sprocket 18 which is splined at 44 to the stub shaft 20 is biased axially into engagement with the inner race of bearing 26 by means of a cap 46 secured in place by bolts 48. Shims 50 may be placed between the cap 46 and the end of the stub shaft 20 for further adjustment purposes.

A disc brake assembly is contained within the housing 30 and comprises a disc pack 52 comprising alternate disc engaging internal splines 54 on the housing 30 and external splines 56 on hub 58 which in turn is splined at 60 to the stub shaft 20. An annular piston 62 is disposed in cylindrical bore 64 formed in housing 30, forming a pressure chamber 66 to which pressurized fluid may be supplied by way of passage 67 for actuating the brakes. A retraction assembly comprising a plurality of springs 68 compressed between keepers 70 held in place by studs 72 and biased against the piston 62 to bias it into the retracted position.

The above described invention discloses a system wherein an entire drive axle sub-assembly including brakes and supporting bearings may be pre-assembled and properly adjusted at a factory or shop for quick assembly in the field by merely attaching to the support housing. This proposed construction provides many advantages including precision adjustment of brakes and bearings at a place where precision equipment is available. Another advantage is that the axle is supported in bearings contained in a substantially rigid housing so as to avoid possible misalignment by flexing of the support arm or housing. A further advantage is an assembly of the disc brake assembly and support bearings at a factory or shop so as to avoid possible field contamination by dirt and grit.

While I have described and illustrated my invention with respect to a specific embodiment, it is to be understood that numerous changes or modifications may be made therein without departing from the spirit and scope of the present invention as defined in the appended claims.

What is claimed is:

1. A drive axle support assembly, said assembly comprising;
    a pivotal support housing pivotally supported about the axis of a main drive shaft;
    a detachable housing carried by said pivotal housing at a position spaced from said axis;
    a stub shaft rotably supported solely by means of a pair of spaced apart tapered roller bearings in said detachable housing;
    the axis of said stub shaft being disposed parallel to and offset from the axis of said main drive shaft;
    a disc brake assembly disposed in said detachable housing between said roller bearings and operatively connected for braking said shaft; and,
    transmission means including a drive chain confined in said pivotal support housing drivingly connecting said main drive shaft to said stub shaft.

2. The invention of claim 1 wherein said detachable housing includes a radially extending flange member attached to said support housing.

3. The invention of claim 2 wherein said detachable housing includes a substantially bell shaped portion having an enlarged end;
    an end plate covering the enlarged end of said housing and including a pilot cylinder portion extending into a pilot bore in said housing; and,
    one of said bearings is supported in said end plate.

4. The invention of claim 3 wherein said housing has a stepped throughbore;
    an annular piston disposed centrally of said housing; and,
    a brake disc pack disposed within the enlarged end of said housing.

5. The invention of claim 1 comprising means to adjust said bearings axially along said stub shaft.

* * * * *